United States Patent Office 2,732,412
Patented Jan. 24, 1956

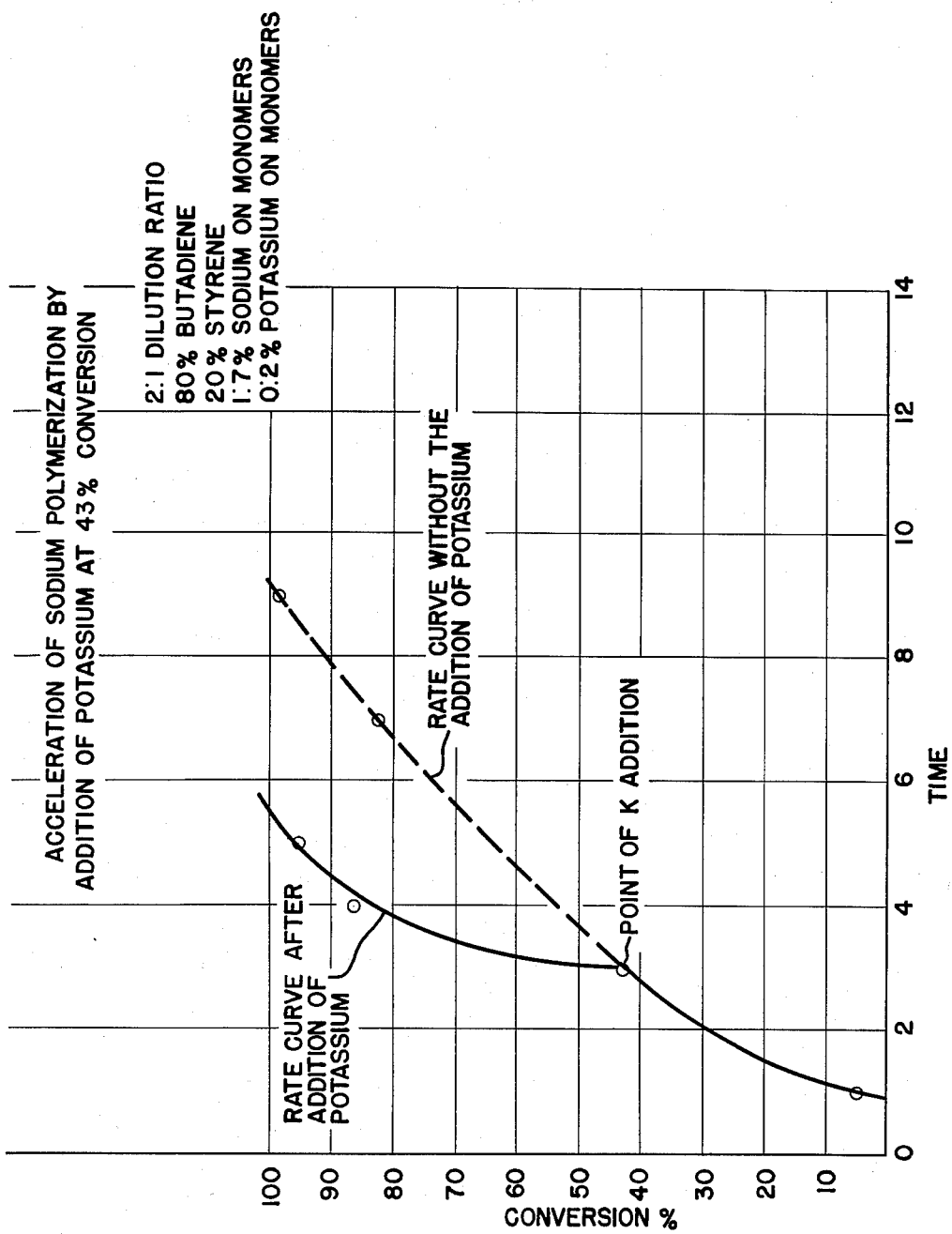

2,732,412

ACCELERATING SODIUM POLYMERIZATIONS

Anthony H. Gleason, Westfield, and Joseph F. Nelson, Rahway, N. J., assignors to Esso Research and Engineering Company, a corporation of Delaware Application October 15, 1952, Serial No. 314,782

9 Claims. (Cl. 260—669)

This invention relates to hydrocarbon polymerization reactions in which sodium is used as the catalyst and more particularly relates to means for accelerating the later stages of such reactions when the reaction has slowed down or even stopped.

The use of sodium as the catalyst for the polymerization of various unsaturated hydrocarbons is well known. It is particularly useful as a catalyst in the polymerization of butadiene and the copolymerization of butadiene and styrene to form rubbery copolymers. Recently it has found use as the catalyst for the preparation of synthetic drying oils by the copolymerization of butadiene and styrene under certain specific conditions.

In all of these reactions it sometimes happens that the reaction does not proceed at a reasonably uniform rate. Thus an initial rate of 10 to 20% conversion per hour during the first half of the polymerization may be followed by rates as low as 1 to 5% in the later stages. In fact, the reaction may even stop altogether at some intermediate level. The exact reason for such behavior is not known, but it appears that it may be due to certain slow-acting poisons which may be present in the monomers or the diluent. Attempts to revive polymerizations which have been prematurely terminated or retarded by the addition of fresh sodium have not been successful within practical time limits because of the fact that sodium is relatively slow acting at temperatures used in the polymerizations even with pretreated diolefins.

According to the present invention, it has been found that the addition of small amounts of metallic potassium to reactions which have slowed down or stopped produces an immediate response. A break is always produced in the rate curve beyond which the slope is considerably greater. This controllable improvement in reaction rate is a definitely surprising result since the presence of potassium in the initial catalyst to reduce the induction period leads to undesirable runaway reactions. This does not occur when potassium is added in the late stages of the reaction.

While the present invention is suitable for all types of polymerization involving the use of sodium as the catalyst, it is particularly suited to the preparation of synthetic drying oils by the copolymerization of butadiene and styrene, in accordance with the process described in Serial No. 176,771, filed July 29, 1950, in the name of Anthony H. Gleason.

In accordance with the disclosure in the above mentioned application, 75 to 85 parts of butadiene are copolymerized with 25 to 15 parts of styrene in the presence of metallic sodium.

The polymerization is carried out in a reaction diluent at temperatures ranging from about 25° C. to 95° C., temperatures between 40° C. and 90° C. are particularly preferred. As a polymerization catalyst about 1.2 to 5 parts, preferably 1.2 to 3 parts, of finely divided sodium per 100 parts of monomers, is used. In the case of continuous polymerizations, higher amounts of sodium are desirable. 1.5 to 8 parts are suitable but 2 to 5 represents the most desirable range.

Materials used as diluents in the polymerization must be liquid at the polymerization temperature, that is, they preferably boil between about 20° C. and 200° C., although more volatile materials boiling as low as −15° C. may be used also, providing that the polymerization pressure is increased correspondingly. Preferred diluents are essentially aliphatic hydrocarbons such as solvent naphtha (boiling range about 90° C. to 120° C.) or straight run mineral spirits such as "Varsol" (boiling range about 150° C. to 200° C.), but butane, pentane, benzene, toluene, xylene, cyclohexane or similar inert hydrocarbons are also useful, individually or in admixture with each other. In general, the aromatic solvents are not so desirable as the aliphatic ones because of the toxicity of the former. The hydrocarbon diluents are used in amounts ranging from 50 to 500, preferably 100 to 400 parts per 100 parts of monomers.

Furthermore, to promote the reaction and to assure the formation of a product of proper clarity, viscosity and drying rate, it is also desirable to employ in the polymerization about 1 to 100 parts of an ether promoter per 100 parts of monomers. Cyclic diethers of 4 to 8 carbon atoms not having an —O—C—O— group in a cylic structure, such as dioxane-1,4 and its methyl and ethyl homologues, have been found as particularly effective promoters. Other suitable ether promoters are aliphatic mono- or di-ethers of 4 to 8 carbon atoms, such as diethyl ether, diethyl ether of ethylene glycol, and diethyl ether of diethylene glycol. Finally, it is also beneficial in many cases, although not essential, to use about 5 to 35 weight per cent (based on sodium) of an alcohol such as methanol, isopropanol or n-amyl alcohol, especially where the sodium catalyst particles are relatively coarse.

The following recipe will illustrate the preparation of the drying oil: 80 parts of butadiene-1,3, 20 parts of styrene, 200 parts of straight run mineral spirits boiling between 150 and 200° C., 40 parts of dioxane, 0.2 parts of isopropanol and 1.5 parts of finely dispersed sodium are heated at about 50° C. in a closed reactor provided with an agitator. Complete conversion is obtained in about 4.5 hours when the reaction proceeds satisfactorily, whereupon the catalyst is destroyed by adding an excess of isopropanol to the polymerized charge. The crude product is cooled, neutralized with carbon dioxide or glacial acetic acid or other anhydrous organic acid and filtered. Instead of destroying the unreacted sodium with alcohol, the acid may be added directly to the crude product. A slight excess of acid is used in order to quickly destroy the sodium. After adding ammonia to react with excess acid, the product is filtered. The filtrate is then fractionally distilled to remove the alcohol, modifiers such as dioxane, and the hydrocarbon solvent to the extent desired. A polymeric product containing about 50–100% non-volatile matter is obtained, the non-volatile matter being a drying oil having an intrinsic viscosity of 0.04 to 0.3 depending on the reaction conditions. The most desirable viscosity range for the drying oil is 0.05 to 0.22 intrinsic viscosity, which corresponds to 0.2 to 3 poise for a 50 wt. percent solution of the drying oil in Varsol, a mineral spirit having a boiling range of 150–200° C.

The advantages of the invention will be better understood from a consideration of the following experimental data which are given for the sake of illustration, but without intention of limiting the invention thereto.

Example 1

Eighty parts of butadiene of 98.5% purity and 20 parts of styrene were copolymerized in 200 parts of Varsol, 30 parts of dioxene and in the presence of 1.5 parts of finely dispersed metallic sodium and 0.3 part of isopropyl alcohol. Including an induction period of about two hours, the reaction would have required about 15 hours at 50° C. based on the performance of a similar run which polymerized slowly for some unknown reason. Upon the addition of 0.1 part of dispersed metallic potassium at 60% conversion, the time of reaction was materially shortened as a result of a sudden increase in reaction rate.

*Example 2*

In another run employing the same conditions as in Example 1, the reaction stopped unaccountably at 50% conversion. The addition of 0.1 to 0.2 part of potassium reactivated the reaction to effect a normal completion of the run.

*Example 3*

In a third run employing similar conditions as in the preceding examples except that 1.7% sodium based on monomers was used, 0.2% potassium based on monomers was added after 43% conversion. This was compared to a run made under the same conditions except no potassium was added at any point. In both cases the reaction was carried to 100% conversion. The addition of the potassium, as shown in the attached chart, resulted in a marked acceleration of the reaction rate as compared to the reaction carried out in the absence of potassium. A conversion of 100% was reached after 5.5 hrs. when the potassium was added as compared to 8¼ hrs. when no potassium was added.

The above examples clearly show the beneficial effect of adding potassium to a sodium-polymerized diolefin reaction which has materially slowed down or stopped. The addition of the potassium is not restricted to any particular range of conversion levels and is only limited by practical consideration such as the vigor of the ensuing reaction. Under the conditions of Example 1, the potassium may suitably be added at conversion levels of 40 to 85 or 90%, depending on the prevailing rate of polymerization and the degree of acceleration desired. The amount of potassium which must be added is relatively small and varies between 0.1 and 1.5 wt. percent based on monomers. The potassium cannot be added in the initial stages of the polymerization since uncontrollable high reaction rates ensue.

The nature of the present invention having been thus fully set forth and specific examples of the same given, what is claimed as new and useful and desired to be secured by Letters Patent is:

1. In a process for copolymerizing a mixture from 75 to 85 per cent of butadiene and 25 to 15 per cent of styrene in 50 to 500 parts by weight of a hydrocarbon diluent, per 100 parts of monomers and 1 to 100 parts by weight of a member of the group consisting of aliphatic ethers of 4 to 8 carbon atoms, dioxane-1,4 and the methyl and ethyl derivatives of dioxane-1,4 in the presence of 1.2 to 8 parts by weight of finely divided sodium at a temperature between 40 and 95° C. in which the reaction has slowed down or completely stopped prior to the completion of the reaction, the improvement which comprises adding 0.1 to 1.5 weight per cent of finely divided potassium, based on monomers, at the point at which the reaction slows down or stops whereby the reaction is reactivated.

2. In a process for copolymerizing a mixture of 80 parts by weight of butadiene and 20 parts by weight of styrene in 200 parts of hydrocarbon diluent, 1.5 to 1.7 parts by weight of finely divided metallic sodium, 30 parts by weight of dioxane-1,4, 0.3 part by weight of isopropyl alcohol at 50° C. in which the reaction has slowed down or completely stopped prior to completion of the reaction, the improvement of which comprises adding 0.1 to 1.5 weight per cent of finely divided potassium, based on monomers, at the point at which the reaction slows down or stops whereby the reaction is reactivated.

3. In a process for copolymerizing a mixture of 80 parts by weight of butadiene and 20 parts by weight of styrene in 200 parts of hydrocarbon diluent, 1.5 to 1.7 parts by weight of finely divided metallic sodium, 30 parts by weight of diethyl ether, 0.3 parts by weight of isopropyl alcohol at 50° C. in which the reaction has slowed down or completely stopped prior to completion of the reaction, the improvement of which comprises adding 0.1 to 1.5 weight per cent of finely divided potassium, based on monomers, at the point at which the reaction slows down or stops whereby the reaction is reactivated.

4. In a process for polymerizing a conjugated diolefin in 50 to 500 parts by weight of a hydrocarbon diluent per 100 parts of monomers and in the presence of 1.2 to 8 parts by weight of finely divided sodium as the catalyst at a temperature between 40 and 95° C. and in which the reaction has slowed down or completely stopped prior to the completion of the reaction, the improvement which comprises adding 0.1 to 1.5 weight per cent of finely divided potassium based on monomers at the point at which the reaction slows down or stops whereby the reaction is reactivated.

5. Process according to claim 4 in which the conjugated diolefin is butadiene-1,3.

6. Process according to claim 5 in which the polymerization is carried out in the additional presence of 1 to 100 parts by weight of a member of the group consisting of aliphatic ethers of 4 to 8 carbon atoms, dioxane-1,4, and the methyl and ethyl derivatives of dioxane-1,4.

7. Process according to claim 5 in which the reaction is carried out in the additional presence of 0.3 part by weight of isopropyl alcohol.

8. In a process for copolymerizing a mixture of from 75 to 85 per cent of butadiene and 25 to 15 per cent of styrene in 50 to 500 parts by weight of a hydrocarbon diluent per 100 parts of monomers and in the presence of 1.2 to 8 parts by weight of finely divided sodium as the catalyst at a temperature between 40 and 95° C. and in which the reaction has slowed down or completely stopped prior to the completion of the reaction, the improvement which comprises adding 0.1 to 1.5 weight per cent of finely divided potassium based on monomers at the point at which the reaction slows down or stops whereby the reaction is reactivated.

9. Process according to claim 8 in which the reaction is carried out in the additional presence of 0.3 weight per cent of isopropyl alcohol.

References Cited in the file of this patent

Marvel et al.: Journal of Polymer Science, vol. 1 (April 1946), pages 275–288 (14 pages).